United States Patent [19]

Wietecha

[11] 4,432,569
[45] Feb. 21, 1984

[54] FLEXIBLE HOSE CHUCK

[75] Inventor: Robert L. Wietecha, Columbia Heights, Minn.

[73] Assignee: Air-Mo Hydraulics, Inc., Minneapolis, Minn.

[21] Appl. No.: 277,289

[22] Filed: Jun. 25, 1981

[51] Int. Cl.³ .............................................. F16L 21/06
[52] U.S. Cl. ...................................... 285/18; 285/322; 279/4
[58] Field of Search ......................... 285/18, 322, 323; 279/4

[56] References Cited

U.S. PATENT DOCUMENTS

| | | | |
|---|---|---|---|
| 3,071,188 | 1/1963 | Raulins | 285/322 X |
| 3,097,866 | 7/1963 | Iversen | 285/322 X |
| 3,505,846 | 4/1970 | Smida | 279/43 X |
| 3,962,769 | 6/1976 | Smida | 279/4 X |
| 3,977,065 | 8/1976 | Johnson | 279/4 X |
| 4,142,739 | 3/1979 | Billingsley | 285/323 X |

*Primary Examiner*—Thomas F. Callaghan
*Attorney, Agent, or Firm*—John S. Munday

[57] ABSTRACT

A chuck device for use with a flexible hose including a porting tube means for attachment at one end to a source of hydraulic fluid and having a central passage for the fluid. Attached on the other end of the porting tube is a seal cartridge means which has a hose engaging cylinder extending away from the porting tube to engage the interior of the hose. Collet means are mounted on the cartridge means and are positioned to engage the exterior of the hose when the hose is on said cylinder. A chuck body means is included which is slideably mounted on the porting tube and the cartridge means to define a power chamber. The porting tube has a fluid passage connecting the power chamber to the central passage of the porting tube. Finally, nose cone means are mounted on the body means and has a collet means engaging surface. The passage of fluid into the chamber forces the collets against the surface and causes them to urge the collets against the hose. The flexible hose is then tightly grasped on the inside and the outside and, as additional fluid pressure is employed, the grip becomes stronger.

1 Claim, 1 Drawing Figure

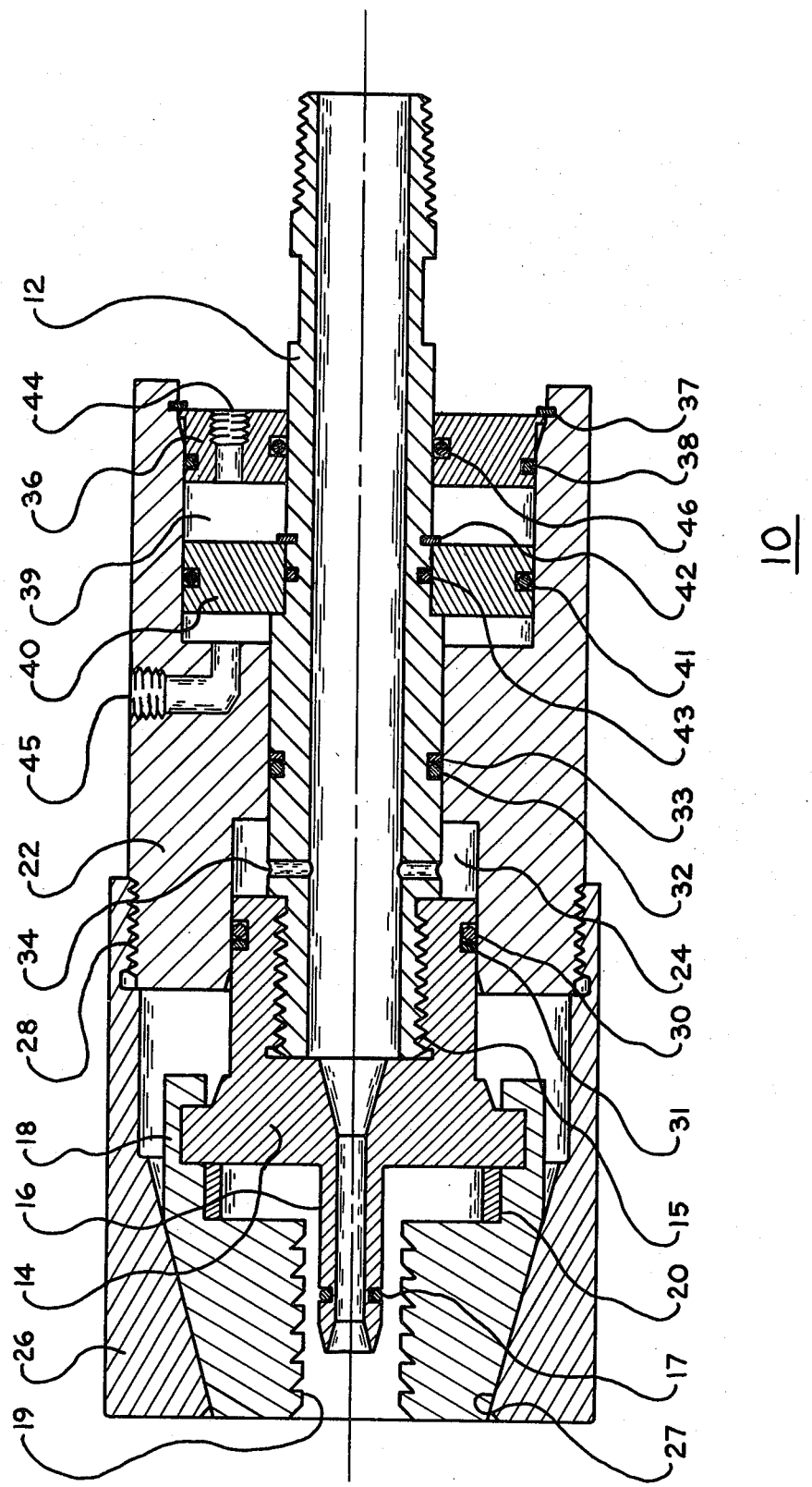

FLEXIBLE HOSE CHUCK

BACKGROUND OF THE INVENTION

Graded devices for use with tubes are known, such devices being disclosed in U.S. Pat. Nos. 1,448,457; 2,479,702; 2,938,562 and 3,200,627. The structures of these patents include fluid conveying mandrels receiveable within the tubes, means for expanding the mandrels to hold the tubing, and die elements against which portions of the tube are flared or otherwise formed by fluid pressure. Many of these expanding devices are customarily used to provide short bulges in tubing for coupling purposes and the like. In addition, they are used to expand tubing to fit fins and other apparatus connected to the outer surface of the tubing.

Several hydraulic chucks have been developed which are suitable for tightly gripping one end of an elongated tube while simultaneously delivering a tube expanding fluid. Among these are U.S. Pat. Nos. 3,505,846; 3,813,751; 3,962,769 and 4,189;162.

SUMMARY OF THE INVENTION

The invention relates broadly to chucks and more specifically to a hydraulic chuck for tightly gripping one end of a flexible tube or hose and simultaneously delivering fluid to the tube. Hoses are filled with fluid under pressure fo a variety of purposes, sometimes only to check for leaks and other stress imperfections. While any flexible hose may be employed in the present invention, particularly suitable are those hoses which have been reinforced with wire mesh and which are designed to withstand substantially high internal pressure.

The chuck of the present invention includes a porting tube means for attachment at one end to a source of hydraulic fluid. The porting tube has a central passage for the fluid from the source. A sealed cartridge means is mounted on the other end of the porting tube and is fitted with a hose engaging cylinder extending away from the porting tube to engage the interior of the flexible hose. Various flexible hoses may be used with one of the chuck devices of the present invention if the sealed cartridge means is detachably mounted such as by threading, to the porting tube so that different sized engagement cylinders may be employed to fit different sized tubes. Collet means are also mounted on the cartridge means and are positioned to engage the exterior of the hose when the hose is on the cylinder. Thus the hose is gripped by the exterior collets and the interior cylinder. As will be apparent from the following discussion, increased pressure of the fluid causes increased gripping by the device itself.

A chuck body means is slideably mounted on the porting tube and on the cartridge means to define a power chamber. This power chamber permits the hydraulic fluid under pressure to act on the various elements which make up the device. The porting tube has a fluid passage means connecting the power chamber to the central passage so that fluid under pressure from the hydraulic fluid source can act as described herein. Finally, nose cone means are mounted on the body means and positioned with a collet means engaging surface such that the passage of fluid into the power chamber forces the cartridge means and therefore the collet means in one direction while the body means and therefore the nose cone means are forced in the opposite direction thereby causing the collet means to engage the engaging surface while forcing the collets tightly against the hose which is engaged on the engaging cylinder of the cartridge means.

In a preferred embodiment, the hose engaging cylinder includes a seal means for preventing passage of fluid between the hose and cylinder. Normally, this seal means can be a simple o-ring seal in a slot provided therefore. Also preferred is to have the chuck body means include a first seal means for preventing passage of fluid between the cartridge and the body and a second seal means for preventing passage of fluid between the porting tube and the body, to thereby prevent escape of fluid from the power chamber. Both the first and second seal means on said chuck body means may generally comprise an o-ring seal with, in a preferred embodiment, a back-up rind.

One embodiment of the present invention includes a pneumatic clamp means cooperatively associated with the porting tube means to selectively urge the collet means against the surface independent of the presence of fluid in the power chamber. Thus, the device can be initially used to position the device prior to use of the high pressure hydraulic fluid. During operation of the power chamber it is normally desireable to have a stop means restraining means to prevent movement of the body beyond a predetermined distance away from the cylinder.

To assist in easily fitting a flexible hose onto the device, in a preferred embodiment, it is desireable to have a collet means and the cartridge means further include a biasing means for urging the collet away from the cylinder. The biasing means, normally a spring loading the collets, is not so strong so as to present any significant resistance during the operation of the fluid in the power chamber.

DESCRIPTION OF THE DRAWINGS

The FIGURE is a section view and side elevation of a chuck device of the present invention, with the section taken along the center axis of the chuck. The flexible hose is not shown.

DETAILED DESCRIPTION OF THE INVENTION

As shown in the FIGURE, the chuck generally is shown by reference numeral 10. Contained as part of the chuck of the present invention is a porting tube 12 for connection to a source of fluid, not shown. Sealed cartridge means 14 is mounted on the porting tube 12, by threads 15 so that different cartridge means 14 can be employed. Extending from the cartridge means 14 is a cylinder 16 for engaging the hose to be treated by the core chuck of this invention. Cylinder 16 means has a sealing means 17 which is present to prevent flow of fluid between the hose which is not shown and the cylinder 16. A simple o-ring in a groove is an adequate seal means 17.

Collets 18 are mounted on the cartridge means 14 and are positioned so that the teeth 19 of the collets 18 engage the hose on the opposite side from that engaged by the cylinder 16. Biasing means 20 is provided to maintain the collets in an open position prior to use. This spring 20 is not strong enough to prevent operation of the device but merely holds the collets 18 away from the cylinder 16. Slideably mounted on the porting tube 12 and seal cartridge means 14 is body 22 which is positioned to define a power chamber 24. Nose cone 26 having a collet engaging surface 27 is threaded on to the body 22 via threads 28. Seal means 30 and back up ring 31 prevent passage of fluid from the power chamber 24 between the cylinder 14 and the body 22. Similarly, seal means ring 32 and back up ring 33 prevent passage of fluid between the body 22 and the porting tube 12. The fluid passage port 34 permits passage of fluid through the porting tube 12 to the power chamber 24.

Air cap 36 is also fitted on the body 22 and porting tube 12 positioned so that key means 37 prevents movement of the body 22 beyond a desired distance from the cylinder 16. Seal 38 and 46 are provided to prevent leaking of air from air chamber 39. Air piston 40 is mounted on porting tube 12 and is fixed in position by key means 42. Seal means 41 and 43 prevent passage of air passed the piston 40. Air input 44 is designed to receive air into the air chamber 39 forcing air piston 40 and therefore porting tube 12 in one direction while key means 37 causes air cap 36 to urge the body 22 in the opposite direction. This force in the two directions causes the cartridge 14 to force the collets 18 against surface 27. This air cylinder is used to mount the chuck on the flexible hose prior to the use of fluid. Once the chuck is mounted on the hose, vent 45 can be used to relieve the air pressure.

To operate the chuck device of the present invention, fluid passes through the porting tube 12 into power chamber 24 via passage 34. The fluid, under pressure also passes through the cylinder 16 into the tube being grasped between th cylinder 16 and the collet 18. As the pressure increases, the power chamber causes the body 22 to move with respect to the porting tube 12, bringing the nose cone 26 into contact with collets 18 so that surface 27 bears against the collets 18. Simultaneously, the fluid in the power chamber 24 causes the cartridge 14 to move with respect to the body 22 forcing the collets 18 against the surface 27 clearly overcoming the bias of spring 20, again forcing the collets 18 against the tube held by cylinder 16. As the fluid pressure is increased, so to is the strength of the grip between the surface 16 and the jaws 19 on the tube or hose.

Having thus described the invention, what is claimed is:

1. A chuck device for use with a flexible hose, comprising:
   a porting tube means for attachment at one end to a source of hydraulic fluid and having a central passage for said fluid;
   a seal cartridge means removeably mounted on the other end of said porting tube and having a hose engaging cylinder extending away from said porting tube to engage the interior of said hose including seal means for preventing passage of fluid between said hose and said cylinder;
   collet means mounted on said cartridge means and positioned to engage the exterior of said hose when said hose is on said cylinder and including biasing means for urging said collets away from said cylinder;
   chuck body means slideably mounted between predetermined limits on said porting tube and said cartridge means to define sealed power chamber, said porting tube having a sealed fluid passage means connecting said power chamber to said central passage;
   nose cone means mounted on said body means and having a collet means engaging surface, whereby passage of fluid into said chamber forces said collets against said surface to urge said collet against said hose; and
   pneumatic clamp means cooperatively associated with said porting tube means to selectively urge said collet means against said surface independent of the presence of fluid in said power chamber.

* * * * *